United States Patent [19]

Bishai

[11] 4,328,825
[45] May 11, 1982

[54] FUEL TANK WATER DRAIN SYSTEM

[75] Inventor: Macram N. Bishai, Flint, Mich.

[73] Assignee: General Motors Corporation, Detroit, Mich.

[21] Appl. No.: 185,627

[22] Filed: Sep. 10, 1980

[51] Int. Cl.³ .............................................. B01D 17/02
[52] U.S. Cl. ..................................... 137/172; 137/204
[58] Field of Search ............... 137/172, 204, 203, 551, 137/552, 558

[56] References Cited

U.S. PATENT DOCUMENTS 3,419,034 12/1968 Hart ..................................... 137/172
3,966,603 6/1976 Grant .............................. 137/172 X

*Primary Examiner*—Alan Cohan
*Attorney, Agent, or Firm*—C. K. Veenstra

[57] ABSTRACT

In a vehicle driven by a diesel engine, a sensor is activated by an accumulation of water in the fuel tank and another sensor is activated when the engine temperature is at a level, less than normal operating level, indicating that the vehicle and its fuel tank have been stationary for a period sufficient to permit separation of the fuel from the water in the tank. A solenoid is energized upon activation of both sensors and opens a drain valve to permit the water to be drained from the tank.

4 Claims, 1 Drawing Figure

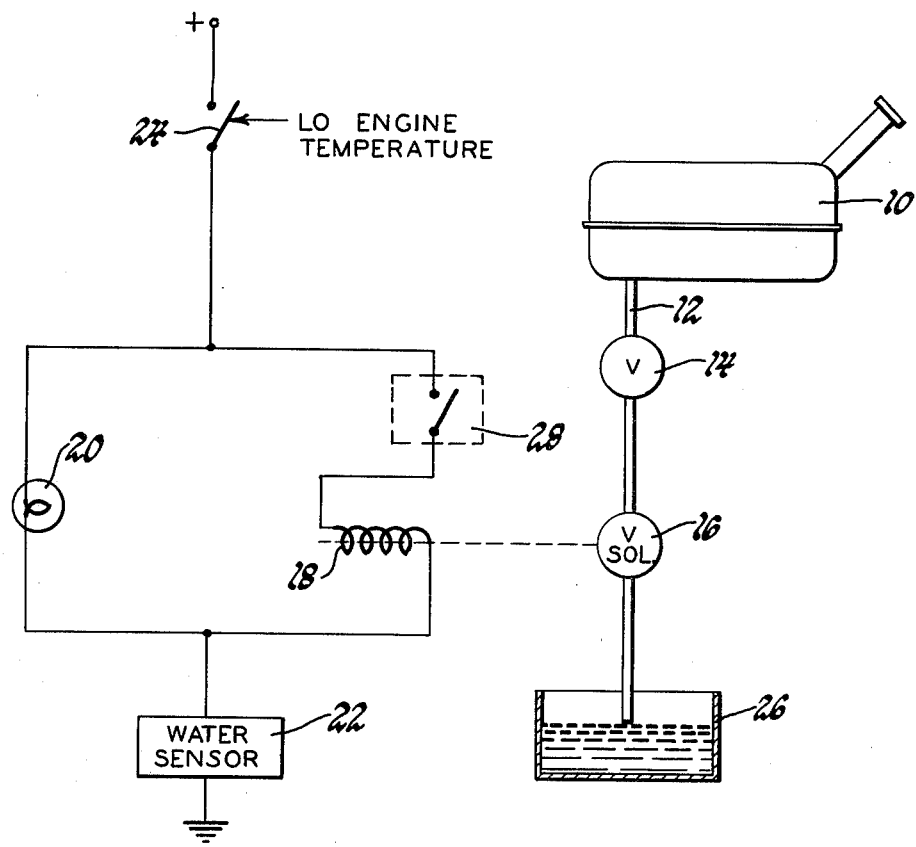

FUEL TANK WATER DRAIN SYSTEM

FIELD OF THE INVENTION

This invention relates to a system for draining water from a vehicle fuel tank.

SUMMARY OF THE INVENTION

Accumulation of water in a fuel tank is of particular concern in diesel engine driven vehicles, and recent instructions concerning certain diesel engine driven vehicles suggest that the fuel tank be drained if excess water accumulates.

This invention provides a system which will enable water to be drained from the fuel tank whenever appropriate. In this system, a water sensor detects an accumulation of water in the fuel tank, another sensor detects when the fuel tank has been quiescent for a period sufficient to assure separation of fuel from the water in the tank, and a solenoid is energizable upon activation of both sensors to open a drain valve which permits the water to be drained from the fuel tank. Accordingly, this system permits water to be drained from the fuel tank without requiring draining of the fuel in the tank.

The details as well as other features and advantages of this invention are set forth in the remainder of the specification and are shown in the accompanying drawing.

SUMMARY OF THE DRAWING

The sole FIGURE of the drawing is a schematic view of an engine driven vehicle fuel tank equipped with this water drain system.

BEST MODE FOR CARRYING OUT THE INVENTION

Referring to the drawing, a vehicle fuel tank 10 has a drain line 12 in which a manual drain valve 14 and an automatic drain valve 16 are disposed in series. Automatic drain valve 16 is operated by a solenoid 18 connected in parallel with an indicator light 20 and in series with a water sensor 22 and a sensor switch 24.

Water sensor 22 allows current flow through solenoid 18 and indicator light 20 when it detects an accumulation of water in fuel tank 10. One example of such a water sensor is the construction set forth in commonly assigned U.S. patent application 106932 filed Dec. 26, 1979 in the names of S. J. Sutton, J. F. Creager and R. B. Gelenius.

Sensor switch 24 closes when fuel tank 10 has been quiescent for a period sufficient to assure that the fuel in tank 10 has separated from any water in tank 10 since at that time water may be drained from the tank without requiring draining of the fuel in the tank. Sensor switch 24 may be activated in any of a variety of ways, but preferably it senses when the vehicle has not been operated for some selected period of time, for example, by sensing when the vehicle engine has been turned off for that period of time. Such may be detected in several ways, and it is suggested, for example, that sensor switch 24 close when the temperature of the engine coolant is below a selected value substantially less than normal engine operating temperatures.

When sensor 22 detects an accumulation of water in fuel tank 10 and sensor switch 24 determines that fuel tank 10 has been quiescent for a period sufficient to assure that the fuel in tank 10 has separated from the water in tank 10, indicator light 20 is energized to provide notice to the vehicle operator that water should be drained from fuel tank 10. Either at that time, or at another more convenient time when indicator light 20 and solenoid 18 are again energized, the vehicle operator manually opens drain valve 14 so that water may be drained from tank 10 through drain line 12 to a suitable container 26. Sensor 22 determines when the water has been drained from tank 10 and automatically deenergizes solenoid 18 to close drain valve 16; the operator then closes manual drain valve 14 to complete the drain process.

If desired, a switch 28 may be provided instead of or in addition to manual drain valve 14. When indicator light 20 is energized, the vehicle operator may close switch 28 to energize solenoid 18, thus opening automatic drain valve 16 to permit draining of water from fuel tank 10.

Thus it will be appreciated that this invention may be employed in a variety of other embodiments within the scope of the following claims.

The embodiments of the invention in which an exclusive property or privilege is claimed are defined as follows:

1. A water drain system for a vehicle fuel tank, said system comprising a sensor activated by the presence of water in the fuel tank, a sensor activated when the fuel tank has been quiescent for a period sufficient to assure separation of water from fuel in the tank, a drain valve, and a solenoid energized in response to activation of both said sensors for opening said drain valve to permit draining of water from the fuel tank.

2. A water drain system for an engine driven vehicle fuel tank, said system comprising a sensor activated by the presence of water in the fuel tank, a sensor activated when the temperature of the engine is below a selected value indicating that the fuel tank has been quiescent for a period sufficient to assure separation of water from fuel in the tank, a drain valve, and a solenoid energized in response to activation of both said sensors for opening said drain valve to permit draining of water from the fuel tank.

3. A water drain system for a vehicle fuel tank, said system comprising a sensor activated by the presence of water in the fuel tank, a sensor activated when the fuel tank has been quiescent for a period sufficient to assure separation of water from fuel in the tank, an automatic drain valve, a solenoid energized in response to activation of both said sensors for opening said automatic drain valve, and a manual drain valve in series with said automatic drain valve through which water may be drained from the fuel tank when said automatic drain valve is open.

4. A water drain system for an engine driven vehicle fuel tank, said system comprising a sensor activated by the presence of water in the fuel tank, a sensor activated when the temperature of the engine is below a selected value indicating that the fuel tank has been quiescent for a period sufficient to assure separation of water from fuel in the tank, an automatic drain valve, a solenoid energized in response to activation of both said sensors for opening said automatic drain valve, and a manual drain valve in series with said automatic drain valve through which water may be drained from the fuel tank when said automatic drain valve is open.

* * * * *